Aug. 20, 1957  J. W. BLACK, JR  2,803,500
WHEEL AND BEARING ASSEMBLY
Filed Oct. 7, 1954
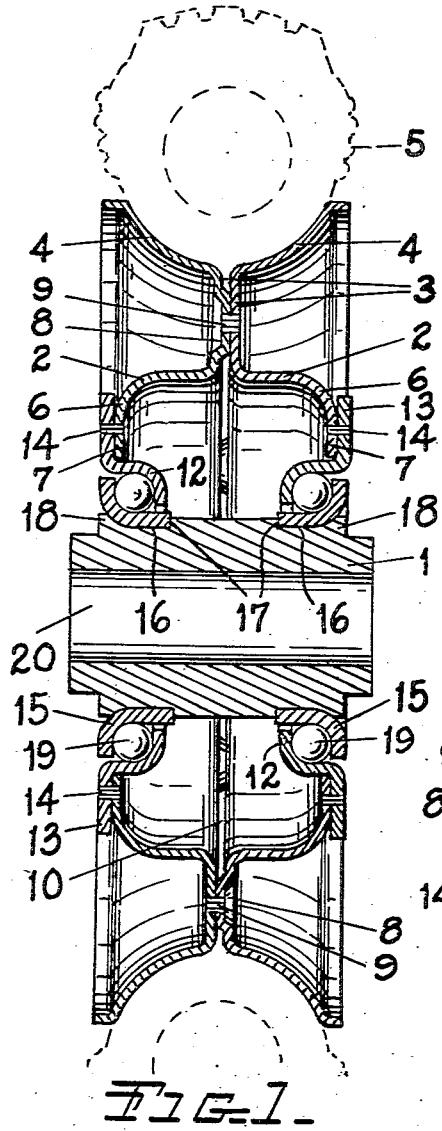
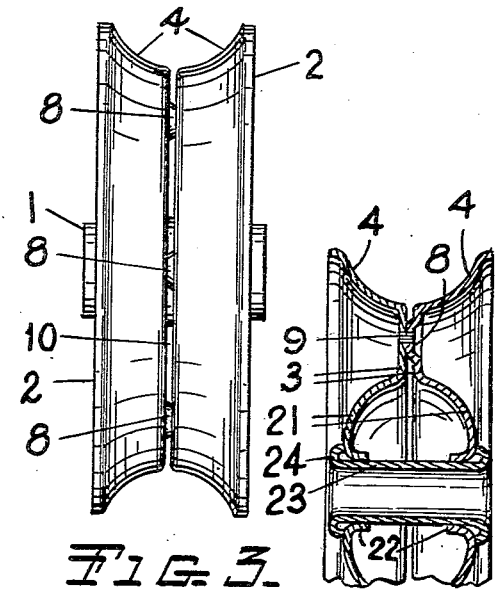
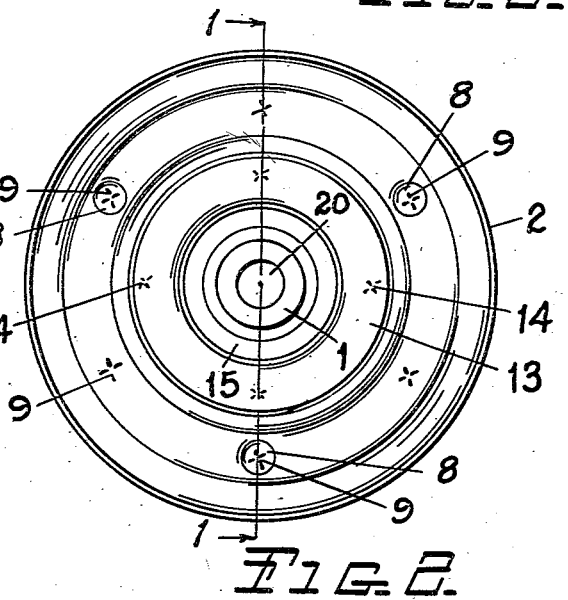
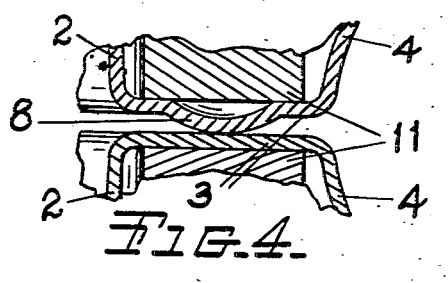
INVENTOR.
John W. Black Jr
BY
O. A. Earl
Attorney.

United States Patent Office 2,803,500
Patented Aug. 20, 1957

2,803,500

WHEEL AND BEARING ASSEMBLY

John W. Black, Jr., Kalamazoo, Mich., assignor to Pemco Wheel Company, Kalamazoo, Mich.

Application October 7, 1954, Serial No. 460,847

9 Claims. (Cl. 301—63)

This invention relates to a wheel and bearing assembly mainly formed of sheet metal stampings and one which is well adapted for use in caster wheels, wheels for lawn mowers and numerous other relations.

The main objects of this invention are:

First, to provide a wheel assembly in which the wheel parts may be effectively cleaned after the assembly thereof to facilitate painting or other finishing.

Second, to provide a wheel structure comprising a pair of wheel members formed as sheet metal stampings, the webs of which are fixedly secured together at angularly spaced points and in spaced relation relative to each other.

Third, to provide a structure embodying these advantages in which the parts may be formed of relatively light stock and at the same time the wheel is rigid and capable of carrying heavy loads.

Objects relating to details and economies of the invention will appear from the description to follow. The invention is defined and pointed out in the claims.

A preferred embodiment of the invention is illustrated in the accompanying drawing, in which:

Fig. 1 is a vertical section through a wheel and bearing assembly embodying my invention taken on a line corresponding to 1—1 of Fig. 2, a tire being indicated by dotted lines.

Fig. 2 is a side elevational view of the wheel assembly, the tire indicated in Fig. 1 being omitted.

Fig. 3 is a plan view.

Fig. 4 is an enlarged fragmentary section illustrating a step in the assembling of the wheel members.

Fig. 5 is a fragmentary section of a modified form of my invention.

In the accompanying drawing 1 represents a spindle member having a central bore 20 adapted to receive a supporting spindle to which the spindle member may be nonrotatably secured. This member 1 is desirably formed as a screw machine part.

The wheel members designated generally by the numeral 2 are formed as sheet metal stampings and are duplicates. These wheel members 2 comprise annular web portions 3 having outwardly flaring rim portions 4 coacting to provide a channel rim for a tire as indicated at 5. The wheel members have outwardly offset inner portions 6 terminating in substantially parallel annular portions 7. The web of each wheel member is provided with angularly spaced bosses 8 of substantial area and height.

The bosses of each wheel member are disposed in angularly spaced alternating relation to the bosses of the other wheel member and welded to the web thereof, as indicated at 9. These bosses are of such area and height that the webs of the wheel members are substantially spaced providing drain openings 10 beeween the webs. The bosses 8 further permit welding by the use of annular electrodes 11, see Fig. 4, which enter the outwardly facing channels resulting from the outwardly flaring outer portions 4 and outwardly offset inner portions 6. The bosses are of sufficient height and area so that relatively high voltage current may be used to insure effective weld located at the bosses.

The outer or wheel bearings 12 are also desirably formed as sheet metal stampings and have outwardly projecting flanges 13 which are secured to the outwardly offset portions 7 of the wheel members by spot welds, as indicated at 14.

The spindle is provided with bearing members 15 desirably formed as sheet metal stampings and sleeved upon the seats 16 provided therefore on the spindle member in supported relation to the shoulders 17. The spindle member has annular upset portions 18 clampingly securing the bearing members 16 to the spindle member. The bearing members 12 and 16 are conformed to coact with ball bearing elements 19 which sustain the radial load and axial thrust of the wheel. It will be appreciated that the bearing elements might be conformed to coact with roller bearing elements but the ball bearing elements are especially desirable on account of economy and the fact that they are well adapted to receive and sustain the radial load and the axial thrust.

In the manufacture of the parts formed as stampings the dies are lubricated and in assembling operation foreign matter is likely to accumulate on the parts. The bosses 8 are not only important in the assembly of the wheel members but they provide drain openings so that the completely assembled unit may be dipped in a cleaning solution and the cleaning solution effectively drained therefrom, for example, by hanging the wheels on a rack having pins with which the bores 20 of the spindle may be engaged.

The structure described is well adapted to receive the bearing closure members of my pending applications.

In the embodiment shown in Fig. 5 the outwardly offset inner wheel portions 21 which correspond to the outwardly offset portions 6 of the previously described embodiment, terminate in inturned flanges 22 in which the tubular hub member 23 is supportedly disposed with the ends of the hub member projecting from the wheel portions 21 and spun or upset outwardly at 24 against the outer side thereof. In this embodiment the complete wheel is formed of three peices. This provides a very economical structure which may be mounted on a spindle to rotate thereon, or fixed to a rotating spindle.

The web portions of the wheel members are connected the same as in the embodiment of Figs. 1 to 4, inclusive, so that the webs are spaced and the assembly can be cleaned by dipping in a cleaning solution preparatory to painting or plating, or otherwise functioning as may be desired.

I have illustrated and described very simple and practical embodiments of my invention. I have not attempted to illustrate or describe other embodiments or adaptations as it is believed this disclosure will enable those skilled in the art to embody or adapt my invention as may be desired.

Having thus described the invention, what is claimed to be new and what is desired to be secured by Letters Patent is:

1. A wheel and bearing assembly comprising a nonrotatable spindle member, wheel members formed as sheet metal stampings and including annular web portions disposed side by side, and outwardly offset radially inner portions, the web portions of each wheel member having angularly spaced inwardly projecting bosses of substantial area and height, the wheel members being arranged with the bosses of one in angularly spaced relation to the bosses of the other, the bosses of one wheel member being welded to the web of the other wheel member fixedly securing the wheel members to each other with the webs thereof in spaced relation providing drain openings between them opening to the periphery of the wheel, outer bearing members fixedly secured to the outwardly offset portions of the wheel members, inner bearing members fixedly secured to said spindle member in radially opposed relation to the outer bearing members, and bearing elements coacting with said outer and inner bearing members, said drain openings between said wheel member webs facilitating the cleaning of the assembly parts after the assembly thereof.

2. A wheel comprising wheel members formed as sheet metal stampings and including annular web portions disposed side by side, outwardly projecting outer portions coacting to provide a rim, and outwardly offset radially inner portions, the web portions of each wheel member having angularly spaced inwardly projecting bosses of substantial area and height, the wheel members being arranged with the bosses of one in angularly spaced relation to the bosses of the other, the bosses of one wheel member being welded to the web of the other wheel member fixedly securing the wheel members to each other with the webs thereof in spaced relation providing drain openings between them opening to the periphery of the wheel.

3. A wheel and bearing assembly comprising a non-rotatable spindle member, wheel members formed as sheet metal stampings and including annular web portions disposed side by side, outwardly projecting outer portions coacting to provide a rim, and outwardly offset radially inner portions, the web portions of at least one wheel member having angularly spaced inwardly projecting bosses of substantial area and height, the bosses being welded to the web of the other wheel member fixedly securing the wheel members to each other with the webs thereof in spaced relation providing drain openings between them opening to the periphery of the wheel, outer bearing members formed as sheet metal stampings and having outturned flanges lapped upon and fixedly secured to the outwardly offset portions of the wheel members, inner bearing members formed as sheet metal stampings fixedly secured to said spindle member in coacting opposed relation to the outer bearing members, and bearing elements coacting with said outer and inner bearing members.

4. A wheel comprising, wheel members formed as sheet metal stampings and including annular web portions disposed side by side, outwardly projecting outer portions coacting to provide a rim, and outwardly offset radially inner portions terminating in inturned annular flanges, the web portion of each wheel having angularly spaced inwardly projecting bosses of substantial area and height, the wheel members being arranged with the bosses of one in angularly spaced relation to the bosses of the other, the bosses of one wheel member being welded to the web of the other wheel member fixedly securing the wheel members to each other with the webs thereof in spaced relation providing drain openings between them opening to the periphery of the wheel, and a tubular member supportedly disposed within said inturned flanges of said inner portions of said wheel with its end projecting therefrom and turned outwardly into retaining engagement with the outer sides of said outwardly offset inner portions of said wheel members.

5. A wheel comprising, wheel members formed as sheet metal stampings and including annular web portions disposed side by side, and outwardly offset radially inner portions, the web portion of each wheel having angularly spaced inwardly projecting bosses of substantial area and height, the wheel members being arranged with the bosses of one in angularly spaced relation to the bosses of the other, the bosses of one wheel member being welded to the web of the other wheel member fixedly securing the wheel members to each other with the webs thereof in spaced relation providing drain openings between them opening to the periphery of the wheel, and a tubular hub member supportedly disposed within said outwardly offset inner portions of said wheel with its end projecting therefrom and turned outwardly into retaining engagement with the outer sides thereof.

6. A fixedly assembled wheel unit consisting of duplicate sheet metal stamping members, each comprising an intermediate annular web portion, an outwardly flaring rim portion, and an outwardly offset radially inner portion adapted to receive bearing parts, the web portion of each member having angularly and uniformly spaced bosses of substantial area and height struck inwardly therefrom, said bosses having tip portions of relatively restricted area, the wheel members being disposed in oppositely facing relation with the bosses of one member in angularly spaced relation to the bosses of the other, the said tip portions of the said bosses of one wheel member being mergingly welded to the web of the other wheel member thereby fixedly securing the wheel members to each other with portions of the bosses other than their said mergingly welded tip portions constituting spacers for the webs and coacting therewith to provide an annular series of radial slot-like openings defined by the webs and bosses and opening to the space between said outwardly offset radially inner portion thereof and the periphery of the wheel unit, said openings facilitating the cleaning and plating of the assembled unit and thereafter providing drainage in use.

7. A fixedly assembled wheel unit consisting of duplicate sheet metal stamping members, each comprising an intermediate annular web portion, an outwardly flaring rim portion, and an outwardly offset radially inner portion adapted to receive bearing parts, the web portion of each member having angularly and uniformly spaced bosses of substantial area and height struck inwardly therefrom, the wheel members being disposed in oppositely facing relation with the bosses of one member in angularly spaced relation to the bosses of the other, relatively restricted tip portions only of the bosses of one wheel member being welded to the web of the other wheel member thereby fixedly securing the wheel members to each other with the portions of the bosses other than their said relatively restricted tip portions thereof constituting spacers for the webs and providing an annular series of radial slot-like openings open to the space defined by said outwardly offset inner portions and to the periphery of the wheel unit.

8. A unitary wheel unit comprising complementary sheet metal stamping members disposed in side by side oppositely facing relation and each comprising an annular web portion, and a radially inner portion adapted to receive a bearing part, the web portion of each member having angularly spaced bosses of substantial area and height struck inwardly therefrom, the wheel members being disposed with the bosses of one member in angularly spaced relation to the bosses of the other, the tip portions of the said bosses of one wheel member being welded to the web of the other wheel member thereby fixedly securing the wheel members to each other with portions of the bosses other than their said tip portions constituting spacers for the webs and coacting therewith to provide an annular series of radial openings defined by the webs and bosses and opening to the space between said wheel members at the inner side of the webs and to the outer periphery of the webs.

9. A unitary wheel unit comprising complementary sheet metal stamping wheel members disposed in oppositely facing side by side relation, and each comprising an intermediate annular web portion, a rim portion, and a radially inner portion adapted to receive a bearing part, the web portion of each member having angularly and uniformly spaced bosses of substantial area and height struck inwardly therefrom, the wheel members being arranged with the bosses of one member in angularly spaced staggered relation to the bosses of the other member, portions only of the bosses of one wheel member being mergingly welded to the web of the other wheel member fixedly securing the wheel members to each other, the portion of the bosses other than said mergingly welded portions thereof constituting spacers for the webs and providing an annular series of radial openings open to the space between said inner portions of the wheel members and said rim portions thereof.

References Cited in the file of this patent

UNITED STATES PATENTS

| | | |
|---|---|---|
| 1,384,783 | Seymour | July 19, 1921 |
| 1,487,552 | Franz | Mar. 18, 1924 |
| 1,492,416 | Beeman | Apr. 29, 1924 |
| 1,716,750 | Anderson | June 11, 1929 |
| 2,087,530 | Potchen | July 20, 1937 |
| 2,643,917 | Douglas et al. | June 30, 1953 |
| 2,734,980 | Millenson | Feb. 14, 1956 |

FOREIGN PATENTS

| | | |
|---|---|---|
| 202,097 | Germany | Sept. 22, 1908 |